United States Patent [19]

Müller

[11] Patent Number: 5,041,715
[45] Date of Patent: Aug. 20, 1991

[54] GAS SPRING, A METHOD OF FILLING A GAS SPRING WITH PRESSURIZED GAS AND AN INSTALLATION FOR PERFORMING THE METHOD

[75] Inventor: Martin Müller, Koblenz, Fed. Rep. of Germany

[73] Assignee: Stabilus GmbH, Koblenz-Neuendorf, Fed. Rep. of Germany

[21] Appl. No.: 551,489

[22] Filed: Jul. 11, 1990

[30] Foreign Application Priority Data

Jul. 15, 1989 [DE] Fed. Rep. of Germany ....... 3923513

[51] Int. Cl.$^5$ ............................................. B23K 26/00
[52] U.S. Cl. ......................... 219/721.64; 219/121.84; 267/64.28
[58] Field of Search ...................... 219/121.63, 121.64, 219/121.84, 121.6, 121.85, 137 R; 267/64.28; 228/101; 445/43; 141/4

[56] References Cited

U.S. PATENT DOCUMENTS 3,033,972  5/1962  Stedman .................... 219/137 R X
3,817,733  6/1974  Thuler ...................... 210/121.84 X
4,635,908  1/1987  Ludwig ...................... 267/64.28 X

FOREIGN PATENT DOCUMENTS 0095552  7/1983  European Pat. Off. .
0107102  2/1984  European Pat. Off. .
1196020  7/1985  Fed. Rep. of Germany .

Primary Examiner—C. L. Albritton
Attorney, Agent, or Firm—Brumbaugh, Graves, Donohue & Raymond

[57] ABSTRACT

A gas spring must be filled with pressurized gas through an opening. This opening must be closed after the filling operation while maintaining the gas pressure within the gas spring. According to an illustrative example of the invention, the filling opening is bored by a laser beam, while the location of the opening to be bored is confined within a filling chamber. After such laser boring of the opening, pressurized gas is admitted to the filling chamber and flows from the filling chamber into the gas spring. Hereinafter, the opening is closed again by directing the laser beam against an annular zone surrounding the opening.

41 Claims, 2 Drawing Sheets

GAS SPRING, A METHOD OF FILLING A GAS SPRING WITH PRESSURIZED GAS AND AN INSTALLATION FOR PERFORMING THE METHOD

BACKGROUND OF THE INVENTION

Gas springs are used to a large extent in motor vehicle constructions, in furniture and in other fields. There is a high demand for manufacturing gas springs at low cost. In the past, one cost-involving step in the manufacturing of the gas spring was the filling of the gas spring with the pressurized gas and the subsequent closing of the filling opening.

STATEMENT OF THE PRIOR ART

From German Patent Publication 11 96 020 it is known to provide the cylinder tube of a gas spring with a filling opening. A filling chamber is established adjacent the filling opening. Pressurized gas is admitted to the filling opening. Hereupon, a closure member, namely a closure ball, is pressed into the filling opening, while the filling opening is still confined within the filling chamber.

This known method is expensive and time-consuming.

OBJECT OF THE INVENTION

It is a primary object of the present invention to provide a gas spring which can be manufactured with reduced time and at reduced costs. It is a further object of the invention to provide a method for manufacturing such a gas spring, which method allows the gas spring to be manufactured at reduced costs and within reduced time.

A further object of the present invention is to provide an installation, in which gas springs can easily be filled with pressurized gas.

SUMMARY OF THE INVENTION

According to the present invention, the cavity confining means comprise wall means provided with at least one solidified fusion zone, said fusion zone consisting of the same material as said wall means and being obtained by fusion closing of a gas filling opening.

The fusion zone may be a result of absorption of electromagnetic radiation and more particularly absorption of a laser beam.

The fusion zone has preferably a substantially circular periphery.

The circular fusion zone has preferably a diameter of less than about 1.5 mm corresponding to a filling hole of less than 0.5 mm.

As a result of closing the filling opening, the fusion zone may provide a crater on an external surface of said cavity confining means. This crater may be lens-shaped.

A gas spring frequently comprises a cylindrical tube member having an axis and two ends, with said piston rod member sealingly guided through one of said ends. The other end of said two ends is in such case closed by an end wall. The solidified fusion zone is preferably located either in the cylindrical tube member or in the end wall.

Frequently, the piston rod member is provided with a piston unit inside the cavity. This piston unit is in sliding engagement with an inner wall surface of the cylindrical tube member. In accordance with the axial movement of the piston rod member, the piston unit is axially movable within said cylindrical tube member through an operational range of movement. It is highly desirable that the inner wall surface of the cylindrical tube member is absolutely smooth within the range of movement of the piston unit. It cannot be excluded that by the fusion closing of the filling opening the smoothness of the inner wall surface is influenced. It is therefore further proposed that the solidified fusion zone is provided within a section of the cylindrical tube member, which section is outside said operational range of movement. It is to be noted, however, that the fusion closing of the filling opening can be performed so precisely that the filling opening may even be bored within the operational range of movement of the piston unit, particularly in cases in which the filling opening has a very small diameter of e.g. less than 0.5 mm.

The invention further relates to a method of introducing a pressurized gas into a gas spring, which comprises cavity confining means confining a cavity therein. For introducing pressurized gas, the cavity confining means may be provided with a gas filling opening. The method of the present invention comprises introducing the pressurized gas into the cavity through the gas filling opening and closing the gas filling opening by directing a beam of electromagnetic radiation towards a zone of said cavity confining means surrounding the location of said gas filling opening. It will be readily understood that the closing of the gas filling opening by melting the material of the cavity confining means is much easier than introducing a closure member into the bore. More particularly, the mechanical installation necessary for fusing the material surrounding the filling opening is less complicated than the mechanical installation necessary for inserting closure members into the gas filling opening in mass production.

A laser beam may be used for closing the gas filling opening.

According to a preferred method, a gas filling chamber is established adjacent an external surface of said cavity confining means by chamber confining means. This gas filling chamber includes the location of the gas filling opening. The filling chamber is separated from atmosphere. A pressurized gas is introduced into the gas filling chamber and flows from the gas filling chamber through the gas filling opening into the cavity. The gas filling opening is hereupon closed, while the location thereof is still contained within the gas filling chamber, and a filling pressure is still contained within the gas filling chamber. The balance of a pressure within the cavity and within the gas filling chamber prevents deformation of the material being fused.

The gas filling opening may be closed by directing the beam of electromagnetic radiation towards the zone around the gas filling opening through a window of said chamber confining means, which window is permeable to said radiation. It is of considerable advantage to direct the beam of radiation through a pressure-tight window, because in such case the source of radiation may be located outside the gas filling chamber. So the volume of the gas filling chamber may be reduced, the sealing problems are also reduced and the source of radiation is not subject to the pressure of the pressurized gas.

In case of a laser beam, the window may be made of a glass material.

It is possible that the filling bore is produced by any known boring method. Preferably, the gas filling opening is bored by a beam of electromagnetic radiation. The boring of the filling hole may be performed at any time before the filling operation. Preferably, however, the boring is performed immediately before the filling operation so that there is no chance of dust and other particles to enter the cavity. It is therefore a preferred method of the present invention that the opening is bored by a first beam of electromagnetic radiation after the gas filling chamber has been established, and that the opening is closed by a second beam of electromagnetic radiation, after said cavity has been filled with pressurized gas.

Both the first and the second beam may be directed towards the location of the opening through a window of the chamber confining means, which window is permeable for the radiation.

The first and the second beam of electromagnetic radiation may be emitted from an identical source of electromagnetic radiation, said first beam being focussed towards the location of said gas filling opening to be bored, and the second beam of electromagnetic radiation may be directed towards an annular zone surrounding said opening. The latter method is highly preferred, because no mechanical adjustment problems arise. The gas spring must be only once positioned opposite to the source of radiation and can remain in this position during boring, the introducing of the pressurized gas and the closing of the filling opening.

The first and the second beam of radiation are different from each other only in that the focus of the first beam is on the wall of the cavity confining means at the location of the bore to be made, while the focus of the second beam of radiation is located more inwards with respect to the cavity so that a high concentration of radiation is obtained in an annular zone around the location of the filling opening. This shift of the focus can be obtained in different ways and can be controlled mechanically or electronically. It is e.g. possible that the source of radiation and/or an optical system allocated thereto are displaced along the axis of the beam. Preferably, the first and the second beam are directed towards the location of said gas filling opening and towards the annular zone surrounding the gas filling opening through an optical system permitting variation of the focus of the respective beam. The variation of the optical system can be controlled mechanically or electronically.

During both the boring and the closing operation, metal vapor is generated by melting the wall of the cavity confining means. This metal vapor may condense within the cavity and within the gas filling chamber into metal particles or into metal layers on confining surfaces of the cavity and the gas filling chamber. Moreover, metal particles may result from droplets of liquid molten metal of the fusion zone. For avoiding such metal particles, it is proposed that the gas filling chamber is flushed with a flushing gas. This flushing is particularly necessary, while said opening is bored by a beam of electromagnetic radiation and during the closing operation.

In case of introducing the laser beam into the filling chamber through a window, this window is most sensitive to being spoiled by metal residues. It is therefore proposed that a stream of flushing gas is provided adjacent and preferably parallel to an inside surface of a window of said chamber confining means.

The invention relates further to an installation for filling a gas spring with a volume of pressurized gas. It is again assumed that the gas spring comprises cavity confining means confining a cavity to be filled with the pressurized gas through a gas filling opening of the cavity confining means. Starting from this assumption, said installation comprises chamber confining means for establishing a gas filling chamber adjacent an external surface of the cavity confining means such that the location of the gas filling opening of said cavity confining means is positioned inside the gas filling chamber. The chamber confining means are provided with inlet means for introducing a pressurized gas into the gas filling chamber. A source of electromagnetic radiation is allocated to said chamber confining means such that a beam of electromagnetic radiation can be directed towards the location of the gas filling opening. It is needless to say that the gas inlet means are provided with valve means for opening and interrupting a stream of pressurized gas towards the gas filling chamber.

According to a preferred embodiment, the source of electromagnetic radiation is provided outside the gas filling chamber. In this case, the chamber confining means comprise a window permeable to electromagnetic radiation. The source of electromagnetic radiation is located such that a beam of electromagnetic radiation is directed through the window towards the location of the gas filling opening.

Frequently, gas springs comprise a cylindrical tube member. For such cylindrical gas springs, the chamber confining means comprise a bore adapted to accommodate at least one end of the cylindrical tube member. Such, the gas filling chamber is at least partially enclosed within the bore. Sealing means are provided for substantially hermetically closing the gas filling chamber within the bore. This embodiment is highly desirable, because it provides easy adjustment of the gas spring with respect to the installation.

It is desirable that the installation is constructed such that the filling opening can be bored and closed again without readjustment of the gas spring with respect to the installation. It is therefore further proposed that the focus of a beam of electromagnetic radiation emitted by said source of electromagnetic radiation is variable with respect to the location of the gas filling opening. This can be established in that the source of electromagnetic radiation is combined with an optical system of variable focus.

The chamber confining means can be provided with flushing means for flushing said gas filling chamber with a flushing gas. These flushing means can be adapted to provide a stream of flushing gas adjacent and preferably parallel to a window permeable to said electromagnetic radiation. It is needless to say that the flushing means may comprise inlet and outlet openings for a flushing gas and that valves may be provided for opening and closing said inlets and outlets.

A further protection against metal deposits within the filling chamber can be obtained in that an aperture is located within the gas filling chamber between the source of electromagnetic radiation and the location of the gas filling opening. This aperture may be conical with a reduced cross-section of said aperture being nearer to the location of the gas filling opening. In case of a window, the aperture is located between the location of said gas filling opening and the window. So the window is fully protected against metal deposits which could after a short period of operation make the window impermeable to the electromagnetic radiation.

It is surprising that no problems result from metal deposits within the cavity. This may be explained by the fact that the cavity is in communication with the fusion zone only for a very short interval after the laser beam has completely perforated the confining wall, and it may be further explained by the very small diameter of the filling opening of less than 0.5 mm and preferably less than 0.3 mm.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which

FIG. 1a is a detail corresponding to the portion X of the filling opening in a cylinder tube according to FIG. 1;

DETAILED DESCRIPTION OF THE PREFERRED EMBODIMENT

Figure 1:
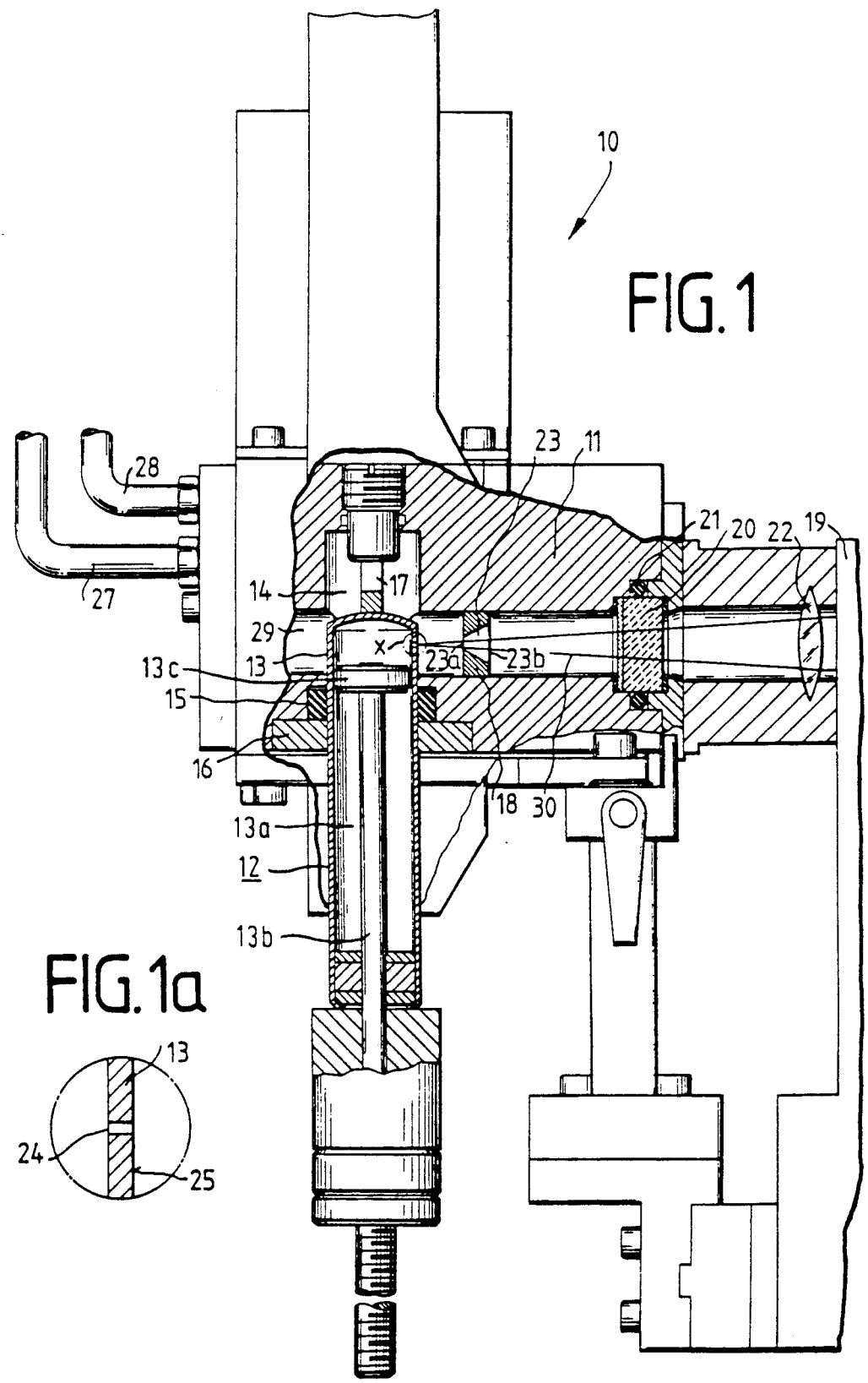
FIG. 1 shows a section through a gas filling apparatus with a gas bell, the cylinder tube of a gas spring clamped in pressure-tight fashion in the gas bell and a laser installation during drilling of a filling opening.
Figure 2:
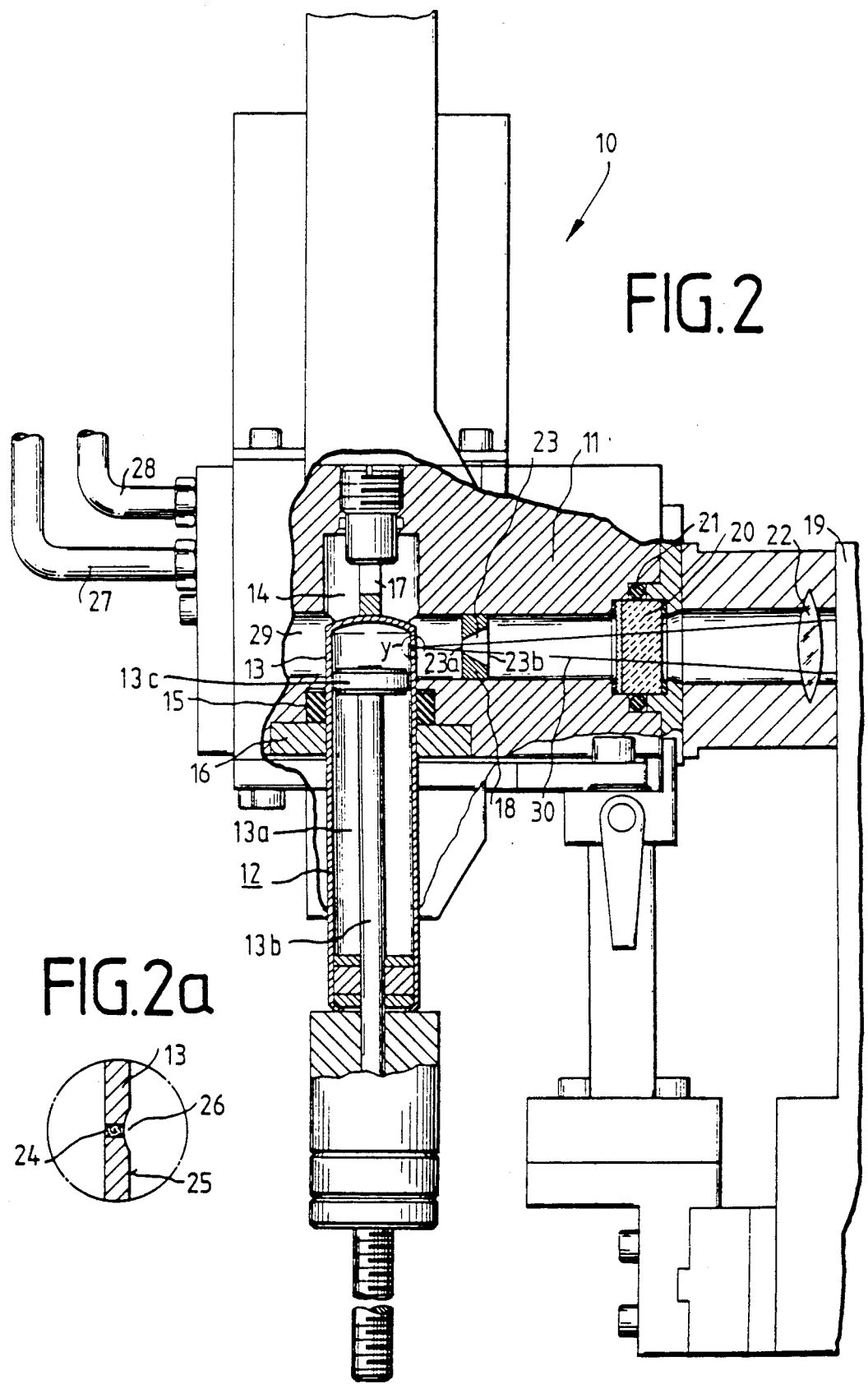
FIG. 2 is a gas filling apparatus according to FIG. 1 with a clamped-in cylinder tube of a gas spring while the filling opening is being welded closed by a laser and FIG. 2a is a detail corresponding to the portion Y in FIG. 2, with the filling opening welded closed and with a fusion crater on the outer surface of the cylinder tube.

The gas filling apparatus 10 shown in FIGS. 1 and 2 consists essentially of a filling head 11 into which a gas spring 12 with its cylinder tube 13 can be clamped in pressure-tight manner. The filling apparatus 10 comprises a filling chamber 14 which can be sealed in respect of the cylinder tube 13 and in respect of the atmosphere by a pressure gasket 15. The pressure gasket 15 is braced in respect of the atmosphere by a retaining device 16 which at the same time holds the gas spring. For accurate positioning of the cylinder tube 13 in the filling chamber 14, an upper holding and abutting device 17 is provided against which the cylinder tube 13 can abut.

Associated with the filling head 11 is a laser 19 which is provided with a lens arrangement 22. The filling head 11 comprises a window which is closed with a glass sheet 20. A laser beam 30 from the laser 19 can be directed laterally against the cylinder tube 13 through the glass sheet 20. The glass sheet 20 is sealed by a gasket 21.

The filling head 11 is provided with a scavenging gas pipe 27 and a filling gas pipe 28. The laser 19 can be used to drill or rather to burn a filling opening 24 into the cylinder tube 13, as shown in detail in FIG. 1a. Through the scavenging gas pipe 27, a scavenging gas can be introduced into the filling chamber 14, while the filling opening 24 is being drilled so that the welded metal particles can be flushed out into the free air through a gas scavenging orifice 29. In the case of the example of embodiment shown, the gas scavenging orifice 29 is provided in the filling chamber 14 on that side which is opposite the glass sheet 20.

Provided between the glass sheet 20 and the clamped-in cylinder tube 13 is a protective diaphragm 18 having an aperture 23 through which the laser beam 30 can pass. The purpose of this protective diaphragm 18 is to prevent metal particles which become fused during laser-drilling of a filling opening 24 shown in detail in FIG. 1a becoming deposited on the inside of the glass sheet 20. For this purpose, the aperture 23 has a small diameter 23a directed towards the cylinder tube 13 and a large diameter 23b which is directed at the glass sheet 20. To prevent particles of metal becoming deposited on the glass sheet 20, it is also possible to provide for a gas current to be directed parallel with the glass sheet 20.

After the filling opening 24 has been drilled, the gas scavenging orifice 29 and the scavenging gas pipe 27 are hermetically closed and with the laser 19 switched off, the pressurized gas is forced through the pressurized gas line 28 at operating pressure and into the filling chamber 14 so that it passes through the filling opening 24 and into the cavity 13a of the cylinder tube 13. When working pressure is attained in the cylinder tube 13, the pressurized gas line 28 is closed and the focal length of the laser 19 is somewhat increased. As shown in FIG. 2, the focal length of the laser beam 30 is so altered mechanically or electronically that the material of the cylinder tube 13 around the edge of the filling opening 24 becomes liquefied and the filling opening 24 is closed again in gas-tight fashion.

Figure 2A:
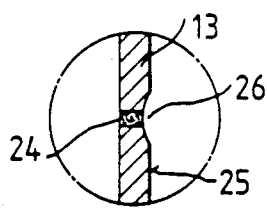

As FIG. 2a shows, the outer surface 25 of the cylinder tube 13 is fused by a fusion crater 26 which is somewhat larger than the filling opening 24. The filling opening 24 is closed thereby by the material of the cylinder tube 13, and a crater-shaped fusion ring 26 forms. The remaining wall thickness of the cylinder tube 13 at the bottom of the crater 26 is subsequently about 70 to 80% of the original wall thickness. After closing of the filling opening, the filling chamber 14 is vented and the filled gas spring 12 can be removed.

The gas spring 12 comprises as usual a piston rod 13b and a piston unit 13c. The piston rod 13b and the piston unit 13c are axially movable with respect to the cylinder tube 13 through an axial range of movement. The cylinder tube 13 is made of metallic material, preferably steel. The piston unit is permeable for the pressurized gas.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A gas spring comprising cavity confining means (13) confining a cavity (13a) therein, a piston rod member (13b) sealingly guided inwards and outwards of said cavity (13a) and a volume of pressurized gas within said cavity (13a), said cavity confining means (13) comprising wall means (13) having formed therein at least one solidified fusion zone (26), said fusion zone (26) consisting of the same material as said wall means (13) and being obtained by fusion closing of a previously gas existing filling opening (24) such that said opening (24) is filled with fused material of said wall means (13) and, as a result of displacement of said plug forming fused material into said opening (24), a crater (26) exists in the external surface zone of said wall means (13) surrounding said opening (24), said crater (26) having a diameter larger than the diameter of said previously existing opening (24).

2. A gas spring as claimed in claim 1, said fusion zone (26) being a result of absorption of electromagnetic radiation.

3. A gas spring as claimed in claim 2, said fusion zone (26) being a result of the absorption of a laser beam (30).

4. A gas spring as claimed in claim 1, said fusion zone (26) having a substantially circular periphery.

5. A gas spring as claimed in claim 4, said fusion zone (26) having a diameter of less than about 1.5 mm.

6. A gas spring as claimed in claim 1, said crater (26) being lens-shaped.

7. A gas spring as claimed in claim 1, said cavity confining means (13) comprising a cylindrical tube member (13) having an axis and two ends, said piston rod member (13b) being sealingly guided through one of said ends, the other of said two ends being closed by an end wall, said solidified fusion zone (26) being located in one of said cylindrical tube member (13) and said end wall.

8. A gas spring as claimed in claim 1, said piston rod member (13b) being provided with a piston unit (13c) inside said cavity (13a), said piston unit (13c) being in sliding engagement with an inner wall surface of said cylindrical tube member (13), said piston unit (13c) being axially movable within said cylindrical tube member (13) through an operational range of movement, said solidified fusion zone (26) being provided within a section of said cylindrical tube member (13), which section is outside said operational range of movement.

9. A method of manufacturing a spring by introducing a pressurized gas into a cavity confining means (13) confining a cavity (13a) therein, said cavity confining means (13) being provided with a gas filling opening g(24) for introducing said pressurized gas into said cavity (13a), said method comprising the steps of:
 introducing said pressurized gas into said cavity (13a) through said gas filling opening (24); and
 closing said gas filling opening (24) by directing a beam (30) of electromagnetic radiation towards a zone of said cavity confining means (13) surrounding the location of said gas filling opening (24).

10. A method as claimed in claim 9, said beam (30) of electromagnetic radiation being a laser beam.

11. A method as claimed in claim 9 wherein a gas filling chamber (14) is established adjacent an external surface (25) of said cavity confining means (13) by chamber confining means (11), said gas filling chamber (14) including said location of said gas filling opening (24), said gas filling chamber (14) being separable from atmosphere, a pressurized gas is introduced into said gas filling chamber (14) and from said gas filling chamber (14) through said gas filling opening (24) into said cavity (13a), and said gas filling opening (24) is closed, while the location thereof is contained within said gas filling chamber (14), and pressure is maintained within said gas filling chamber (14).

12. A method as claimed in claim 11, said gas filling opening (24) being closed by directing said beam (30) of electromagnetic radiation towards said zone (26) through a window (20) of said chamber confining means (11), which window (20) is permeable to said radiation.

13. A method as claimed in claim 12, wherein said window (20) is made of a glass material.

14. A method as claimed in claim 9, wherein said gas filling opening (24) is bored by a beam (30) of electromagnetic radiation.

15. A method as claimed in claim 11 wherein said opening (24) is bored by a first beam (30) of electromagnetic radiation after said gas filling chamber (14) has been established, and said opening (24) is closed by a second beam (30) of electromagnetic radiation, after said cavity has been filled with pressurized gas.

16. A method as claimed in claim 15, both said first and said second beam (30) being directed towards said location of said opening (24) through a window (20) of said chamber confining means (11), which window (20) is permeable to said radiation.

17. A method as claimed in claim 15 said first and said second beam (30) of electromagnetic radiation being emitted from an identic source (19) of electromagnetic radiation, said first beam (30) being focussed towards the location of said gas filling opening (24) to be bored, and said second beam (30) of electromagnetic radiation being directed towards an annular zone surrounding said opening (24).

18. A method as claimed in claim 17, said first and said second beam (30) being directed towards said location of said gas filling opening (24) and towards said annular zone surrounding said gas filling opening (24) through an optical system (22) permitting variation of the focus of the respective beam (30).

19. A method as claimed in claim 11, said gas filling chamber (14) being flushed with a flushing gas.

20. A method as claimed in claim 19, said gas filling chamber (14) being flushed, while said opening (24) is bored by a beam (30) of electromagnetic radiation.

21. A method as claimed in claim 20, a stream of flushing gas being provided adjacent and preferably parallel to an inside surface of a window (20) of said chamber confining means (11) permeable to said beam (30) of electromagnetic radiation.

22. An installation for filling a gas spring with a volume of pressurized gas, said gas spring (12) comprising cavity confining means (13) confining a cavity (13a) to be filled with said pressurized gas through a gas filling opening (24) of said cavity confining means (13), said installation comprising chamber confining means (11) for establishing a gas filling chamber (14) adjacent an external surface (25) of said cavity confining means (13) such that the location of said gas filling opening (24) of said cavity confining means (13) is positioned inside said gas filling chamber (14), said chamber confining means (11) being provided with inlet means (28) for introducing a pressurized gas into said gas filling chamber (14), a source (19) of electromagnetic radiation being allocated to said chamber confining means (11) such that a beam (30) of electromagnetic radiation can be directed towards said location of said gas filling opening (24).

23. An installation as claimed in claim 22, said source (19) of electromagnetic radiation being provided outside said gas filling chamber (14), said chamber confining means (11) comprising a window (20) permeable to electromagnetic radiation, said source (19) of electromagnetic radiation being located such that a beam (30) of electromagnetic radiation is directed through said window (20) towards said location of said gas filling opening (24).

24. An installation as claimed in claim 23, said cavity confining means (13) comprising a cylindrical tube member (13), said chamber confining means (11) comprising a bore adapted to accommodate at least one end of said cylindrical tube member (13), said gas filling chamber (14) being at least partially enclosed within said bore, sealing means (15) being provided for substantially hermetically closing said gas filling chamber (14) within said bore.

25. An installation as claimed in claim 22, wherein the focus of a beam (30) of electromagnetic radiation emitted by said source (19) of electromagnetic radiation is variable with respect to said location of said gas filling opening (24).

26. An installation as claimed in claim 22, wherein said source (19) of electromagnetic radiation is combined with an optical system (22) of variable focus.

27. An installation as claimed in claim 22, wherein said chamber confining means (11) are provided with flushing means (27, 29) for flushing said gas filling chamber (14) with a flushing gas.

28. An installation as claimed in claim 27, wherein said flushing means (27, 29) are adapted to provide a stream of flushing gas adjacent and preferably parallel to a window (20) permeable to said electromagnetic radiation.

29. An installation as claimed in claim 22, wherein an aperture (23) is located within said gas filling chamber (14) between said source (19) of electromagnetic radiation and said location of said gas filling opening (24).

30. An installation as claimed in claim 29, wherein said aperture (23) is conical with a reduced cross-section (23a) of said aperture (23) being nearer to said location of said gas filling opening (24).

31. An installation as claimed in claim 29 wherein said aperture (23) is located between said location of said gas filling opening (24) and a window (20) of said chamber confining means (11) permeable for said electromagnetic radiation.

32. A gas spring, as claimed in claim 1, with said opening (24) having a diameter of less than about 0.5 mm.

33. A gas spring as claimed in claim 1 with said opening (24) having a diameter of less than 0.3 mm.

34. A gas spring as claimed in claim 1, with said wall means (13) having a wall thickness at the bottom of said crater (26) of about 70 to 80% of the wall thickness of said wall means (13) surrounding said crater (26).

35. A gas spring comprising cavity confining means (13) confining a cavity (13a) therein, a piston rod member (13b) sealingly guided inwards and outwards of said cavity (13a) and a volume of pressurized gas within said cavity (13a), said cavity confining means (13) comprising wall means (13) provided with at least one solidified fusion zone (26), said fusion zone (26) consisting of the same material as said wall means (13) and being obtained by fusion closing of a gas filling opening (24), with said fusion zone (26) having a substantially circular periphery and a diameter of less than about 1.5 mm.

36. A method of manufacturing a gas spring by introducing a pressurized gas into a cavity confining means (13) confining a cavity (13a) therein, said cavity confining means (13) being provided with a gas filling opening (24) for introducing said pressurized gas into said cavity (13a), said method comprising the steps of:
  introducing said pressurized gas into said cavity (13a) through said gas filling opening (24); and
  closing said gas filling opening (24) by directing a beam (30) of electromagnetic radiation towards a zone of said cavity confining means (13) surrounding the location of said gas filling opening (24) so as to fuse material of said cavity confining means (13) and displace said fused material into said gas filling opening (24), thereby forming a crater (26) in an external surface zone of said cavity confining means (13) with said crater (26) surrounding said opening (24) and having a diameter larger than said opening (24).

37. A method of manufacturing a gas spring by introducing a pressurized gas into a cavity confining means (13) confining a cavity (13a) therein, said cavity confining means (13) being provided with a gas filling opening (24) for introducing said pressurized gas into said cavity (13a), said method comprising the steps of:
  introducing said pressurized gas into said cavity (13a) through said gas filing opening (24); and
  closing said gas filling opening (24) by directing a beam (30) of electromagnetic radiation towards a zone of said cavity confining means (13) surrounding the location of said gas filling opening (24) while substantially balancing the pressure within said cavity (13a) and outside said cavity confining means (13) at the location of said gas filling opening (24).

38. A method as claimed in claim 36, wherein said fusing and displacing of said material of said cavity confining means (13) occurs when the pressure within said cavity (13a) and the pressure outside said cavity confining means (13) at the location of the gas filling opening (24) are substantially balanced.

39. A method as claimed in claim 36, wherein said fused material within said gas filling opening (24) and said crater (26) define a fusion zone, with said fusion zone having a substantially circular periphery with a diameter of less than about 1.5 mm.

40. A method as claimed in claim 9, wherein said gas filling opening (24) has a diameter of less than about 0.5 mm.

41. A method as claimed in claim 9, wherein said gas filling opening (24) has a diameter of less than about 0.3 mm.

* * * * *

UNITED STATES PATENT AND TRADEMARK OFFICE
CERTIFICATE OF CORRECTION

PATENT NO. : 5,041,715

DATED : August 20, 1991

INVENTOR(S) : Martin Muller

It is certified that error appears in the above-identified patent and that said Letters Patent is hereby corrected as shown below:

On the title page, under "FOREIGN PATENT DOCUMNETS", "7/1985" should read --7/1965--.

Col. 6, lines 65-66, "previously gas existing" should read --previously existing gas--.

Col. 7, line 40, "g(24)" should read --(24)--.

Col. 9, line 36, "permeable for" should read --permeable to--.

Signed and Sealed this

Thirteenth Day of April, 1993

Attest:

STEPHEN G. KUNIN

*Attesting Officer*     *Acting Commissioner of Patents and Trademarks*